(12) United States Patent
Hashimoto

(10) Patent No.: US 11,176,416 B2
(45) Date of Patent: Nov. 16, 2021

(54) PERCEPTION DEVICE

(71) Applicant: TOYOTA JIDOSHA KABUSHIKI KAISHA, Toyota (JP)

(72) Inventor: Daisuke Hashimoto, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 15/959,745

(22) Filed: Apr. 23, 2018

(65) Prior Publication Data

US 2019/0034762 A1 Jan. 31, 2019

(30) Foreign Application Priority Data

Jul. 27, 2017 (JP) .............................. JP2017-145733

(51) Int. Cl.
*G06K 9/62* (2006.01)
*G06K 9/00* (2006.01)
*G06N 3/08* (2006.01)
*G06N 3/04* (2006.01)

(52) U.S. Cl.
CPC ....... *G06K 9/6256* (2013.01); *G06K 9/00805* (2013.01); *G06K 9/6268* (2013.01); *G06K 9/6273* (2013.01); *G06K 9/6282* (2013.01); *G06N 3/0454* (2013.01); *G06N 3/08* (2013.01); *G06N 3/084* (2013.01); *G06N 3/0445* (2013.01)

(58) Field of Classification Search
None
See application file for complete search history.

(56) References Cited

U.S. PATENT DOCUMENTS

| 5,295,227 A | 3/1994 | Yokono | |
|---|---|---|---|
| 5,960,391 A * | 9/1999 | Tateishi | G10L 21/0272 704/202 |
| 2013/0300608 A1* | 11/2013 | Margalef | G01S 5/0252 342/451 |
| 2014/0108094 A1* | 4/2014 | Beddo | G06Q 10/067 705/7.31 |

(Continued)

FOREIGN PATENT DOCUMENTS

| JP | H05-197705 A | 8/1993 |
|---|---|---|
| JP | H08-305820 A | 11/1996 |

(Continued)

OTHER PUBLICATIONS

Li et al.,"ViP-CNN: Visual Phrase Guided Convolutional Neural Network", arXiv:1702.07191v2 [cs.CV] Apr. 10, 2017 (Year: 2017).*

*Primary Examiner* — Randolph I Chu
(74) *Attorney, Agent, or Firm* — Oliff PLC

(57) ABSTRACT

A perception device includes: a first neural network that performs a common process associated with perception of an object and thus outputs results of the common process; a second neural network that receives an output of the first neural network and outputs results of a first perception process of perceiving the characteristics of the object with a first accuracy; and a third neural network that receives the output of the first neural network and intermediate data which is generated by the second neural network in the course of the first perception process and outputs results of a second perception process of perceiving the characteristics of the object with a second accuracy which is higher than the first accuracy.

15 Claims, 8 Drawing Sheets

(56) References Cited

U.S. PATENT DOCUMENTS

| | | | |
|---|---|---|---|
| 2015/0332126 A1 | 11/2015 | Hikida | |
| 2016/0110642 A1 | 4/2016 | Matsuda et al. | |
| 2016/0260014 A1 | 9/2016 | Hagawa et al. | |
| 2016/0335534 A1* | 11/2016 | Nere | G06N 3/0445 |
| 2018/0047159 A1* | 2/2018 | Schlegl | G06K 9/6267 |
| 2018/0075341 A1* | 3/2018 | Dasgupta | G06N 3/0445 |
| 2018/0124414 A1* | 5/2018 | Van Leuven | H04N 19/124 |
| 2018/0129961 A1* | 5/2018 | Kailas | G06N 7/005 |
| 2019/0026538 A1* | 1/2019 | Wang | G06K 9/4652 |
| 2019/0122077 A1* | 4/2019 | Tsishkou | G06N 3/0454 |
| 2019/0131016 A1* | 5/2019 | Cohen | G06K 9/6274 |
| 2019/0228268 A1* | 7/2019 | Zhang | G06K 9/0014 |
| 2019/0294896 A1* | 9/2019 | Jia | G06K 9/00369 |

FOREIGN PATENT DOCUMENTS

| | | |
|---|---|---|
| JP | 2014-229124 A | 12/2014 |
| JP | 2016-033806 A | 3/2016 |
| JP | 2017-084320 A | 5/2017 |
| WO | 2017/007626 A1 | 1/2017 |

\* cited by examiner

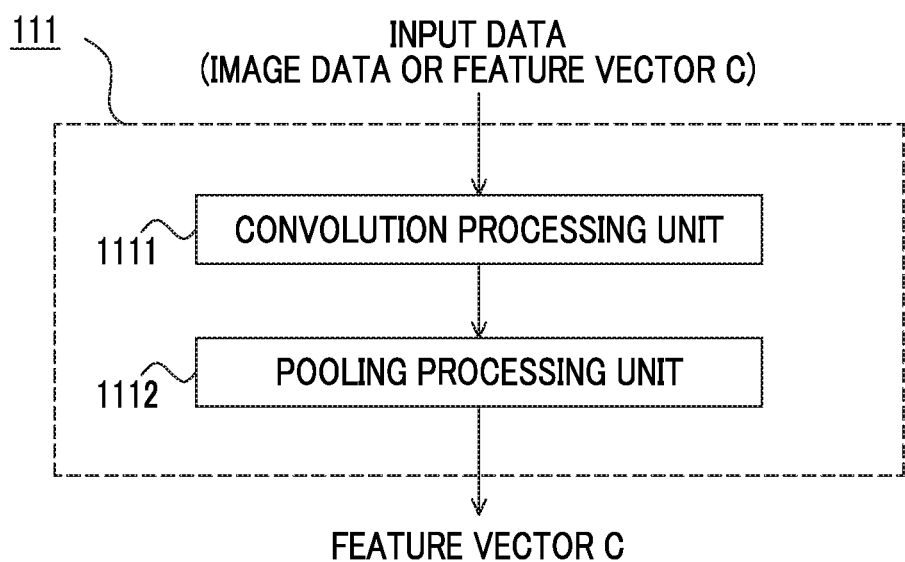
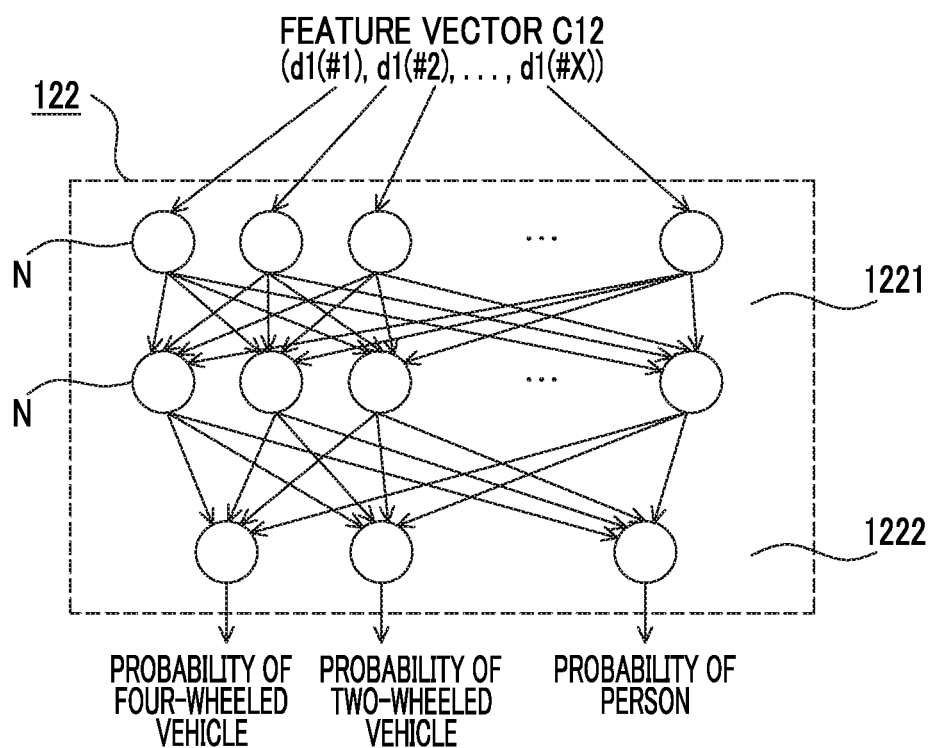

FIG. 9

| IMAGE DATA ID | CORRECT ANSWER DATA OF PROBABILITY p1 (MAIN CATEGORY) | | | CORRECT ANSWER DATA OF PROBABILITY p2 (SUB CATEGORY) | | | | | | | |
|---|---|---|---|---|---|---|---|---|---|---|---|
| | PROBABILITY OF FOUR-WHEELED VEHICLE | PROBABILITY OF TWO-WHEELED VEHICLE | ... | PROBABILITY OF HUMAN | PROBABILITY OF PASSENGER CAR | PROBABILITY OF TRUCK | PROBABILITY OF BUS | ... | PROBABILITY OF MOTORBIKE | PROBABILITY OF BICYCLE | ... | PROBABILITY OF PEDESTRIAN | PROBABILITY OF DRIVER | ... |
| OBJECT #A1 | 1 | 0 | ... | 0 | 1 | 0 | 0 | ... | 0 | 0 | ... | 0 | 0 | ... |
| OBJECT #A2 | 1 | 0 | ... | 0 | 0 | 1 | 0 | ... | 0 | 0 | ... | 0 | 0 | ... |
| OBJECT #A3 | 1 | 0 | ... | 0 | 0 | 0 | 1 | ... | 0 | 0 | ... | 0 | 0 | ... |
| ... | ... | ... | ... | ... | ... | ... | ... | ... | ... | ... | ... | ... | ... | ... |
| OBJECT #B1 | 0 | 1 | ... | 0 | 0 | 0 | 0 | ... | 1 | 0 | ... | 0 | 0 | ... |
| OBJECT #B2 | 0 | 1 | ... | 0 | 0 | 0 | 0 | ... | 0 | 1 | ... | 0 | 0 | ... |
| ... | ... | ... | ... | ... | ... | ... | ... | ... | ... | ... | ... | ... | ... | ... |
| OBJECT #C1 | 0 | 0 | ... | 1 | 0 | 0 | 0 | ... | 0 | 0 | ... | 1 | 0 | ... |
| OBJECT #C2 | 0 | 0 | ... | 1 | 0 | 0 | 0 | ... | 0 | 0 | ... | 0 | 1 | ... |
| ... | ... | ... | ... | ... | ... | ... | ... | ... | ... | ... | ... | ... | ... | ... |

PERCEPTION DEVICE

INCORPORATION BY REFERENCE

The disclosure of Japanese Patent Application No. 2017-145733 filed on Jul. 27, 2017 including the specification, drawings and abstract is incorporated herein by reference in its entirety.

BACKGROUND

1. Technical Field

The disclosure relates to a perception device that can perceive, for example, characteristics of an object.

2. Description of Related Art

As an example of a perception device, a perception device that perceives what an object in an image is using a neural network is disclosed in Japanese Patent Application Publication No. 2017-084320 (JP 2017-084320 A). A perception device that perceives what a language of an input voice is using a neural network is disclosed in Japanese Patent Application Publication No. 2014-229124 (JP 2014-229124 A). A perception device that perceives a category of an object in an image using a neural network is disclosed in Japanese Unexamined Patent Application Publication No. 2016-033806 (JP 2016-033806 A).

SUMMARY

Perception devices are used for various purposes. In this case, a situation in which a perception device which is used for a first purpose only needs to perceive characteristics of an object with a first accuracy which is relatively low but a perception device which is used for a second purpose other than the first purpose needs to perceive characteristics of an object with a second accuracy which is relatively high may occur. In this case, a perception device that perceives characteristics of an object with the first accuracy and a perception device that perceives characteristics of an object with the second accuracy are generally independently constructed. That is, two types of neural networks which are included in two types of perception devices with different accuracies for perceiving characteristics of an object are separately constructed.

However, such two types of perception devices are common in that they perceive the same characteristics of an object. Accordingly, there is room for improvement in efficiently constructing two types of perception devices.

The disclosure provides a perception device which can be relatively efficiently constructed, and the perception device at least includes a perception device capable of perceiving characteristics of an object with a first accuracy which is relatively low. The perception device can also include a perception device capable of perceiving characteristics of an object with a second accuracy which is relatively high.

An aspect of the disclosure relates to a perception device including: a first neural network receiving a first input data associated with an object, the first neural network performing a common process associated with perception of the object based on the first input data, the first neural network outputting results of the common process; a second neural network receiving an output of the first neural network as a second input data, the second neural network performing a first perception process of perceiving characteristics of the object with a first accuracy based on the second input data, the second neural network outputting results of the first perception process; and a third neural network receiving the output of the first neural network and an intermediate data which is generated by the second neural network during the first perception process, the output of the first neural network and the intermediate data being received as a third input data by the third neural network, the third neural network performing a second perception process of perceiving characteristics of the object with a second accuracy which is higher than the first accuracy based on the third input data, the third neural network outputting results of the second perception process.

With the perception device of the above aspect, it is possible to construct the second neural network and the third neural network in parallel. Accordingly, in comparison with a case in which the second and third neural networks are separately constructed, it is possible to more efficiently construct the second neural network and the third neural network. Accordingly, it is possible to more efficiently construct a perception device that can perceive characteristics of an object with the first accuracy which is relatively low and a perception device that can perceive characteristics of an object with the second accuracy which is relatively high.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a block diagram illustrating a configuration of a feature extractor;

FIG. 3 is a block diagram illustrating a configuration of a classifier;

FIG. 9 is a table illustrating an example of training data which is used for the training operation.

DETAILED DESCRIPTION OF EMBODIMENTS

Hereinafter, a perception device according to an embodiment of the disclosure will be described. In the following description, a perception device 1 that can perceive a category of an object which appears in an image captured by a camera 31 implemented in a vehicle 3 with a relatively low first accuracy and perceive the category of the object with a relatively high second accuracy will be described as the perception device according to the embodiment of the disclosure.

(1) Configuration of Perception Device 1

Figure 1:
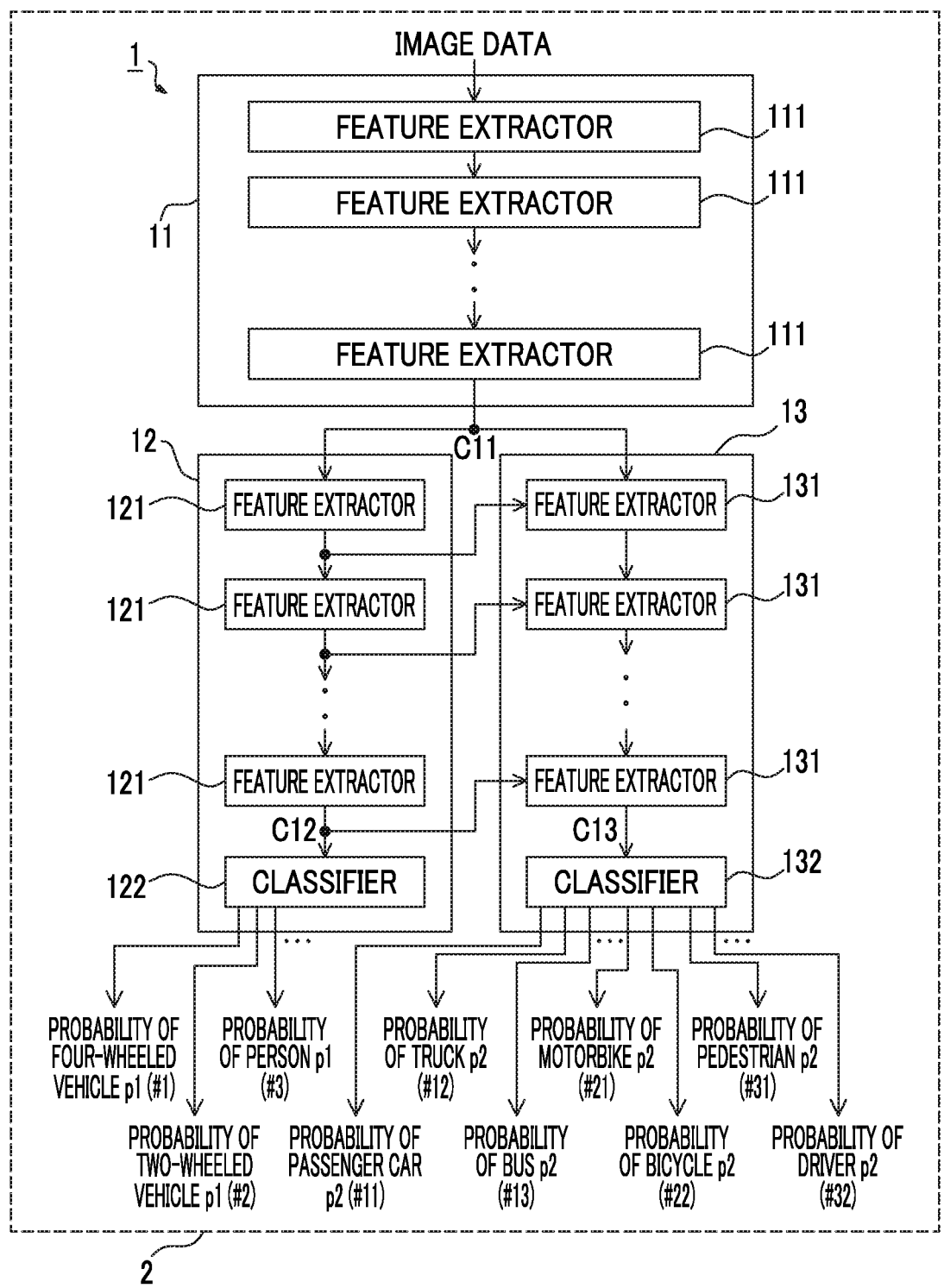
FIG. 1 is a block diagram illustrating a configuration of a perception device according to an embodiment.

First, a configuration of the perception device 1 according to the embodiment will be described below with reference to FIG. 1. FIG. 1 is a block diagram illustrating a configuration of the perception device 1 according to the embodiment.

As illustrated in FIG. 1, the perception device 1 includes a common neural network 11, a branch neural network 12, and a branch neural network 13. A neural network is a network constituted by collections of nodes or units that are connected such that they can communicate with each other. The neural network is able to, for example, adjusting strength of the communication between the nodes through training processing so as to analyze an image and perceive a feature of the image. The common neural network 11 is an example of a "first neural network" in the disclosure. The branch neural network 12 is an example of a "second neural network" in the disclosure. The branch neural network 13 is an example of a "third neural network" in the disclosure. The perception device 1 is a processing block. By executing software on a processor 2, the processing block is logically embodied in the processor 2. The processor 2 is, for example, a central processing unit (CPU) or an electronic control unit (ECU).

Image data indicating an image captured by the camera 31 which is implemented in the vehicle 3 is input to the common neural network 11. The image data is an example of "first input data" in the disclosure. The common neural network 11 performs a common process associated with perception of a category of an object on the image data. The common process is a process which is commonly performed in a first perception process and a second perception process. The first perception process is a process of perceiving a category of an object which appears in the image indicated by the image data with a first accuracy which is relatively low. The second perception process is a process of perceiving a category of an object with a second accuracy which is relatively high. That is, the common process is a process which is performed in a previous stage of the branch neural network 12 that performs the first perception process and the branch neural network 13 that performs the second perception process.

The common process includes a first feature extracting process. In the first feature extracting process, a feature vector C indicating a feature of an object is calculated based on the image data. In order to perform the first feature extracting process, the common neural network 11 includes L feature extractors 111. L is the number of the feature extractor 111. L may be equal to or greater than 2, but also may be 1. Each feature extractor 111 can calculate a feature vector C indicating a feature of an object. The L feature extractors 111 are connected in series in multiple stages such that the feature vector C calculated by the feature extractor 111 in a previous stage is input to the feature extractor 111 in a subsequent stage. Note that the image data instead of the feature vector C calculated by another feature extractor 111 stage is input to the feature extractor 111 in the first stage, and the feature vector C calculated by the feature extractor 111 in the final stage is not input to another feature extractor 111.

Each feature extractor 111 calculates the feature vector C using an existing algorithm for extracting a feature. In the following description, for the purpose of convenience of explanation, an example in which each feature extractor 111 calculates the feature vector C by performing a convolution process on input data being input to the corresponding feature extractor 111 will be described. The input data is the image data or the feature vector C which is calculated by another feature extractor 111. That is, in the following description, an example in which the common neural network 11 is a convolutional neural network (CNN) will be described. In this case, each feature extractor 111 includes a convolution processing unit 1111 and a pooling processing unit 1112, for example, as illustrated in FIG. 2. The convolution process which is performed by the convolution processing unit 1111 may be the same as an existing convolution process, and the pooling process which is performed by the pooling processing unit 1112 may be the same as an existing pooling process. Accordingly, for the purpose of simplification of explanation, details of the convolution process and the pooling process will not be described, and summaries of the convolution process and the pooling process will be described below in brief. The convolution processing unit 1111 performs a convolution process using a convolution filter having desired filter characteristics on input data. Data which is obtained as the result of the convolution process is input to the pooling processing unit 1112. This data is, for example, a feature map. The pooling processing unit 1112 performs a pooling process on the feature map. As a result, the pooling processing unit 1112 outputs a feature vector C of a predetermined dimension indicating the feature of the input data, that is, the feature of an object.

In FIG. 1, output data output from the common neural network 11 is input to the branch neural network 12 as input data. The output data output from the common neural network 11 is data indicating the result of the common process. Specifically, the output data is the feature vector C calculated by the feature extractor 111 in the final stage. Hereinafter, the feature vector C corresponding to the output data output from the common neural network 11 is referred to as a "feature vector C11." The feature vector C11 is an example of "second input data" in the disclosure. The branch neural network 12 performs a first perception process of perceiving a category of an object with a first accuracy which is relatively low based on the feature vector C11. More specifically, the branch neural network 12 performs a first estimation process of estimating which category of a plurality of main categories the object belongs to, and the first estimation process is performed based on the feature vector C11 as the first perception process.

The first estimation process includes a second feature extracting process of calculating the feature vector C indicating the feature of the object based on the feature vector C11. The second feature extracting process may be different from the first feature extracting process, which is performed by the common neural network 11, in that a feature vector C which is more suitable for perceiving the category of the object with the first accuracy is calculated. The first estimation process includes a first classifying process of calculating a probability p1 that the object belongs to each of the plurality of main categories based on the result of the second feature extracting process.

In order to perform the second feature extracting process, the branch neural network 12 includes M feature extractors 121. M is the number of the feature extractor 121. M may be equal to or greater than 2, but also may be 1. Each feature extractor 121 is an example of a "first processing block" in the supplements which will be described later. Each feature extractor 121 can calculate a feature vector C indicating a feature of an object. The M feature extractors 121 are connected in series in multiple stages such that the feature vector C calculated by the feature extractor 121 in a previous stage is input to the feature extractor 121 in a subsequent stage. Note that the feature vector C11 output from the common neural network 11 instead of the feature vector C calculated by the feature extractor 121 in a previous stage is input to the feature extractor 121 in the first stage, and the feature vector C calculated by the feature extractor 121 in the final stage is not input to another feature extractor 121.

Each feature extractor 121 calculates the feature vector C using an existing algorithm for extracting a feature. In the following description, for the purpose of convenience of explanation, an example in which each feature extractor 121 calculates the feature vector C by performing a convolution process on input data input to the corresponding feature extractor 121 will be described. The input data is the feature vector C11 output from the common neural network 11 or the feature vector C which is calculated by another feature extractor 121. That is, in the following description, an example in which the branch neural network 12 is a convolutional neural network (CNN) will be described. In this case, similarly to the above-mentioned feature extractor 111, each feature extractor 121 includes a convolution processing unit 1211 and a pooling processing unit 1212 which are not illustrated. A convolution filter which is used for the convolution processing unit 1211 may be different from the convolution filter which is used for the convolution processing unit 1111 in that the convolution filter used for the convolution processing unit 1211 is more suitable for perceiving a category of an object with the first accuracy. In the other configurations, the convolution processing unit 1211 and the pooling processing unit 1212 may be the same as the convolution processing unit 1111 and the pooling processing unit 1112.

In order to perform the first classifying process, the branch neural network 12 includes a classifier 122. Data indicating the result of the second feature extracting process is input as input data to the classifier 122. The data indicating the result of the second feature extracting process is the feature vector C which is calculated by the feature extractor 121 in the final stage. Hereinafter, the feature vector C corresponding to the data indicating the result of the second feature extracting process is referred to as a "feature vector C12." The classifier 122 calculates a probability p1 that an object appearing in an image belongs to each of the plurality of main categories based on the feature vector C12. For example, FIG. 1 illustrates an example in which the classifier 122 calculates a probability p1(#1) that the object belongs to a main category of "four-wheeled vehicle," a probability p1(#2) that the object belongs to a main category of "two-wheeled vehicle," and a probability p1(#3) that the object belongs to a main category of "person."

For example, as illustrated in FIG. 3, the classifier 122 includes fully connected layers 1221 to which X input values (d1(#1), d1(#2), d1(#3), d1(#X)) constituting the feature vector C12 of an X dimension are input and an output layer 1222 that outputs the probability p1 based on the output from the fully connected layers 1221. Here, X is the number of the input values constituting the feature vector C12, and X is an integer which is equal to or greater than 1.

Referring back to FIG. 1, output data output from the common neural network 11 is input to the branch neural network 13. This output data is the feature vector C11. The feature vector C11 is an example of "third input data" in the disclosure. The branch neural network 13 performs a second perception process of perceiving a category of an object with a second accuracy which is relatively high based on the feature vector C11. More specifically, the branch neural network 13 performs a second estimation process of estimating which sub category of a plurality of sub categories the object belongs to on the basis of the feature vector C11 as the second perception process. The sub categories are subdivided from the plurality of main categories.

The second estimation process includes a third feature extracting process of calculating the feature vector C indicating the feature of the object based on the feature vector C11. The third feature extracting process may be different from the first feature extracting process which is performed by the common neural network 11 and the second feature extracting process which is performed by the branch neural network 12. The third feature extracting process may be different from the first feature extracting process and the second feature extracting process in that a feature vector C which is more suitable for perceiving the category of the object with the second accuracy is calculated. The second estimation process includes a second classifying process of calculating a probability p2 that the object belongs to each of the plurality of sub categories based on the result of the third feature extracting process.

In order to perform the third feature extracting process, the branch neural network 13 includes N feature extractors 131. N is the number of the feature extractors 131. N may be equal to or greater than 2, but also may be 1. Each feature extractor 131 is an example of a "second processing block" in the disclosure. Each feature extractor 131 can calculate a feature vector C indicating a feature of an object. The N feature extractors 131 are connected in series in multiple stages such that the feature vector C calculated by the feature extractor 131 in a previous stage is input to the feature extractor 131 in a subsequent stage. Note that the feature vector C11 output from the common neural network 11 instead of the feature vector C calculated by another feature extractor 131 is input to the feature extractor 131 in the first stage, and the feature vector C calculated by the feature extractor 131 in the final stage is not input to another feature extractor 131.

The feature vector C which is calculated by the feature extractor 121 corresponding to each feature extractor 131 is also input to the feature extractor 131. Accordingly, the feature extractor 131 calculates the feature vector C based on the feature vector C calculated by the corresponding feature extractor 121 in addition to the feature vector C11 output from the common neural network 11 or the feature vector C calculated by another feature extractor 131. FIG. 1 illustrates an example in which the number of feature extractors 131 is equal to the number of feature extractors 121 and the feature vector C which is calculated by the feature extractor 121 in the same stage as each feature extractor 131 is input to the feature extractor 131. The feature vector C which is from each feature extractor 121 and is input to the corresponding feature extractor 131 is an example of "intermediate data" in the disclosure.

Each feature extractor 131 calculates the feature vector C using an existing algorithm for extracting a feature. In the following description, for the purpose of convenience of explanation, an example in which each feature extractor 131 calculates the feature vector C by performing a convolution process on input data input to the corresponding feature extractor 131 will be described. The input data is the feature vector C11 output from the common neural network 11 or the feature vector C which is calculated by another feature extractor 131 and the feature vector C which is calculated by the corresponding feature extractor 121. That is, in the following description, an example in which the branch neural network 13 is a convolutional neural network (CNN) will be described. In this case, similarly to the above-mentioned feature extractor 111, each feature extractor 131 includes a convolution processing unit 1311 and a pooling processing unit 1312 which are not illustrated. A convolution filter which is used for the convolution processing unit 1311 may be different from the convolution filter which is used for the convolution processing unit 1111 or the convolution filter which is used for the convolution processing unit 1211 in that it is more suitable for perceiving a category of an object with the second accuracy. In other configurations, the convolution processing unit 1311 and the pooling processing unit 1312 may be the same as the convolution processing unit 1111 and the pooling processing unit 1112 (or the convolution processing unit 1211 and the pooling processing unit 1212).

In order to perform the second classifying process, the branch neural network 13 includes a classifier 132. Data indicating the result of the third feature extracting process is input as input data to the classifier 132. The data indicating the result of the third feature extracting process is the feature vector C which is calculated by the feature extractor 131 in the final stage. Hereinafter, the feature vector C corresponding to the data indicating the result of the third feature extracting process is referred to as a "feature vector C13." The classifier 132 calculates a probability p2 that an object appearing in an image belongs to each of the plurality of sub categories based on the feature vector C13. For example, FIG. 1 illustrates an example in which the classifier 132 calculates a probability p2(#11) that the object belongs to a sub category of "passenger car," a probability p2(#12) that the object belongs to a sub category of "truck," and a probability p2(#13) that the object belongs to a sub category of "bus." The sub category of "passenger car," the sub category of "truck," and the sub category of "bus" correspond to sub categories which are subdivided from the main category of "four-wheeled vehicle." For example, FIG. 1 illustrates an example in which the classifier 132 calculates a probability p2(#21) that the object belongs to a sub category of "motorbike" and a probability p2(#22) that the object belongs to a sub category of "bicycle." The sub category of "motorbike" and the sub category of "bicycle" correspond to sub categories which are subdivided from the main category of "two-wheeled vehicle." For example, FIG. 1 illustrates an example in which the classifier 132 calculates a probability p2(#31) that the object belongs to a sub category of "pedestrian" and a probability p2(#32) that the object belongs to a sub category of "driver." The sub category of "pedestrian" and the sub category of "driver" correspond to sub categories which are subdivided from the main category of "person."

For example, similarly to the classifier 122, the classifier 132 includes fully connected layers 1321 to which Y input values (d2(#1), d2(#2), d2(#3), d2(#Y)) constituting the feature vector C13 of a Y dimension are input and an output layer 1322 that outputs the probability p2 based on the output from fully connected layers 1321. Y is the number of the input values constituting the feature vector C13 and is an integer equal to or greater than 1. For the purpose of convenience of explanation, fully connected layers 1321 and the output layer 1322 are not illustrated.

(2) Method of Implementing Perception Device 1 in Vehicle 3

The perception device 1 can be implemented in the vehicle 3 as a perception device 1a that can perceive a category of an object with the second accuracy which is relatively high. An example of the vehicle 3 in which the perception device 1 is implemented as the perception device 1a is a vehicle 3a that can travel automatically based on images captured by the camera 31, that is, can travel without requiring a driver's operation. This is because it is preferable that the vehicle 3a that can travel automatically perceive what an object near the vehicle 3a is with a relatively high accuracy.

The perception device 1 can be implemented in the vehicle 3 as a perception device 1b that can perceive a category of an object with the first accuracy which is relatively low. An example of the vehicle 3 in which the perception device 1 is implemented as the perception device 1b is a vehicle 3b that can detect an object near the vehicle 3b based on images captured by the camera 31 and perform an avoidance operation for avoiding collision with the object when there is a likelihood of collision with the object. This is because the vehicle 3b that can perform the avoidance operation may only need to detect that an object with a likelihood of collision with the vehicle 3b is near the vehicle 3b and there is low necessity for specifically perceiving what the object is with a relatively high accuracy.

Accordingly, a first implementing method of implementing the perception device 1 as the perception device 1a in the vehicle 3a and a second implementing method of implementing the perception device 1 as the perception device 1b in the vehicle 3b will be sequentially described below. Here, the perception device 1 may be implemented as the perception device 1a or 1b in a vehicle other than the vehicles 3a and 3b or arbitrary equipment other than a vehicle.

Figure 4:
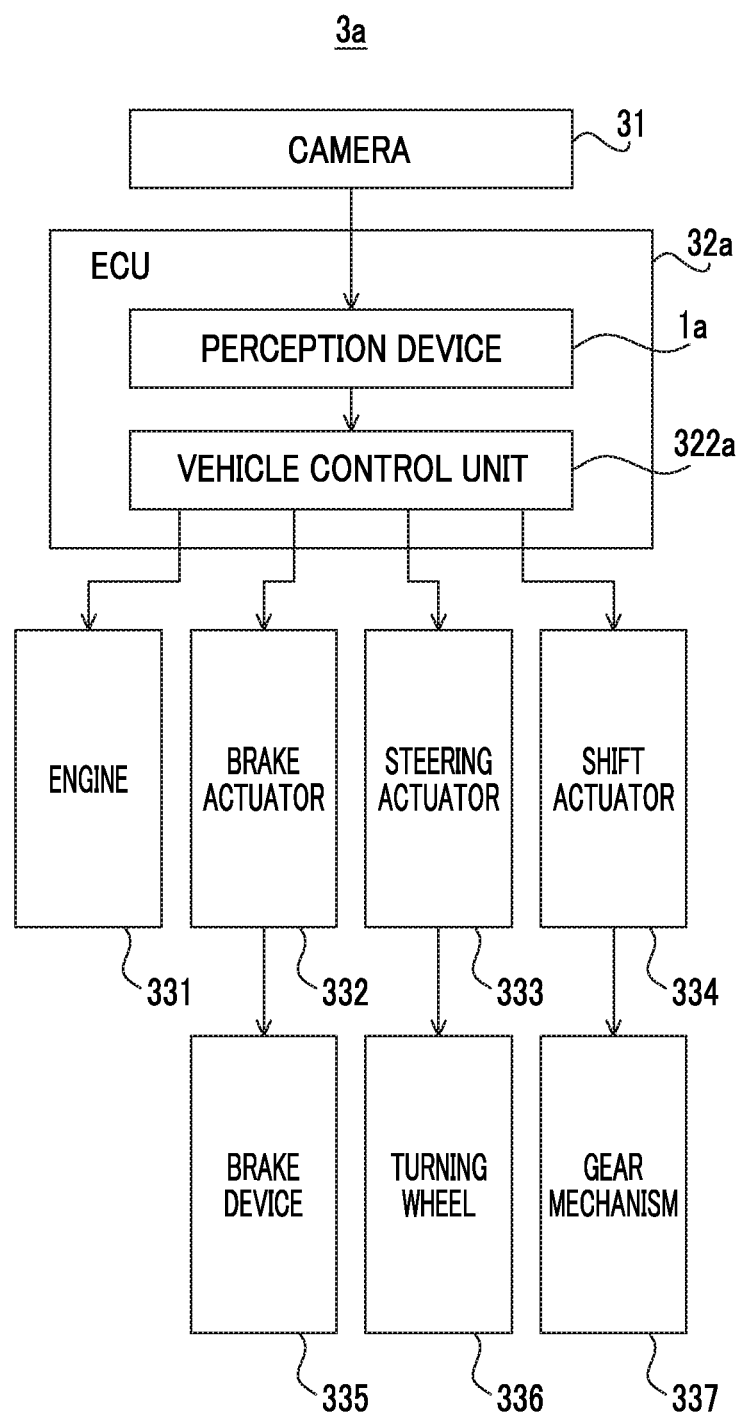
FIG. 4 is a block diagram illustrating a configuration of a vehicle in which a perception device is implemented using a first implementing method.
Figure 5:
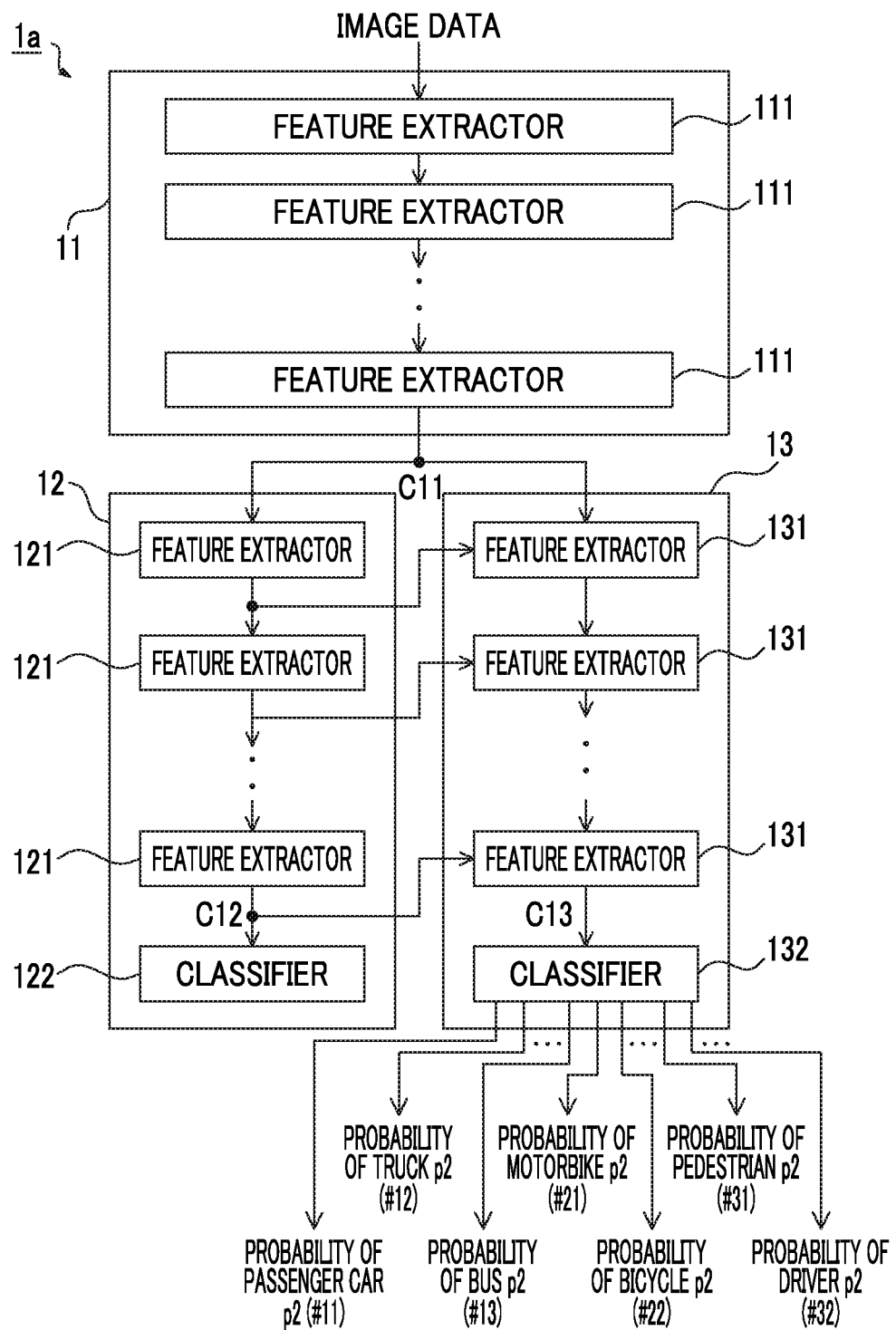
FIG. 5 is a block diagram illustrating a configuration of the perception device which is implemented using the first implementing method.

(2-1) First Implementing Method of Implementing Perception Device 1 as Perception Device 1a in Vehicle 3a First, the first implementing method of implementing the perception device 1 as the perception device 1a in the vehicle 3a will be described with reference to FIGS. 4 and 5. FIG. 4 is a block diagram illustrating the configuration of the vehicle 3a in which the perception device 1 is implemented using the first implementing method. FIG. 5 is a block diagram illustrating the configuration of the perception device 1a which is implemented using the first implementing method.

As illustrated in FIG. 4, the vehicle 3a includes a camera 31, an electronic control unit (ECU) 32a, an engine 331, a brake actuator 332, a steering actuator 333, a shift actuator 334, a brake device 335, turning wheels 336, and a gear mechanism 337.

The camera 31 is an imaging device that images surroundings of the vehicle 3a.

The ECU 32a controls all operations of the vehicle 3a. In this embodiment, particularly, the ECU 32a includes the perception device 1a and a vehicle control unit 322a as processing blocks which are logically embodied in the ECU 32a. As illustrated in FIG. 5, the perception device 1a has the same configuration as the perception device 1. However, the perception device 1a may not perceive a category of an object with the first accuracy which is relatively low and thus may not include the classifier 122. The vehicle control unit 322a generates a moving route along which the vehicle 3a should move from a current position of the vehicle 3a to a target position based on the perception results and the like of the perception device 1a, and controls the engine 331, the brake actuator 332, the steering actuator 333, and the shift actuator 334 such that the vehicle 3a moves automatically along the generated moving route.

The engine 331 is a drive source that supplies a driving force to driving wheels which are not illustrated. That is, the engine 331 supplies a driving force to at least some of the vehicle wheels. The engine 331 can adjust the driving force supplied to the driving wheels under the control of the vehicle control unit 322a. The brake actuator 332 controls the brake device 335 that can apply a brake to the vehicle wheels which are not illustrated such that a braking force is applied to the vehicle 3a under the control of the vehicle control unit 322a. The steering actuator 333 turns the turnable turning wheels 336 such that the vehicle 3a moves in a desired direction under the control of the vehicle control unit 322a. The shift actuator 334 controls the gear mechanism 337 such that a gear range of the gear mechanism 337 that can transmit power of the engine 331 to the driving wheels is switched to a desired gear range under the control of the vehicle control unit 322a. The gear mechanism 337 is, for example, a transmission.

Figure 6:
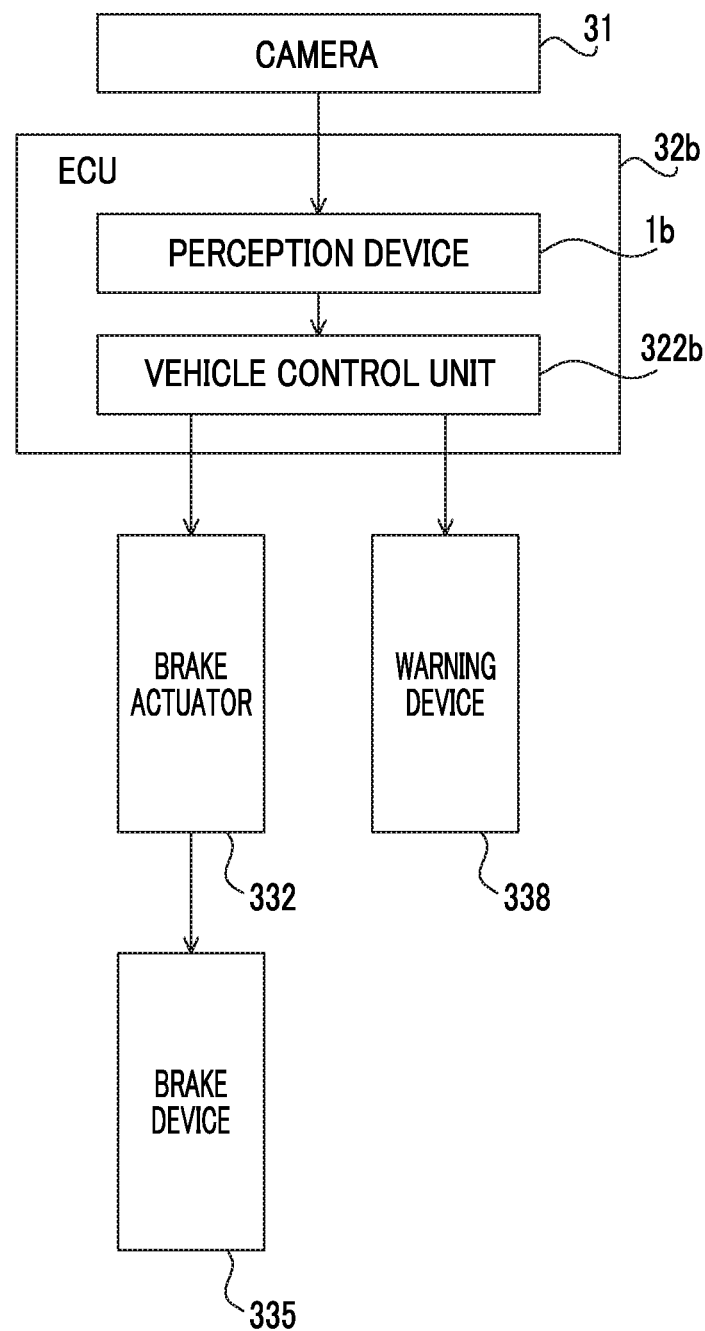
FIG. 6 is a block diagram illustrating a configuration of a vehicle in which a perception device is implemented using a second implementing method.
Figure 7:
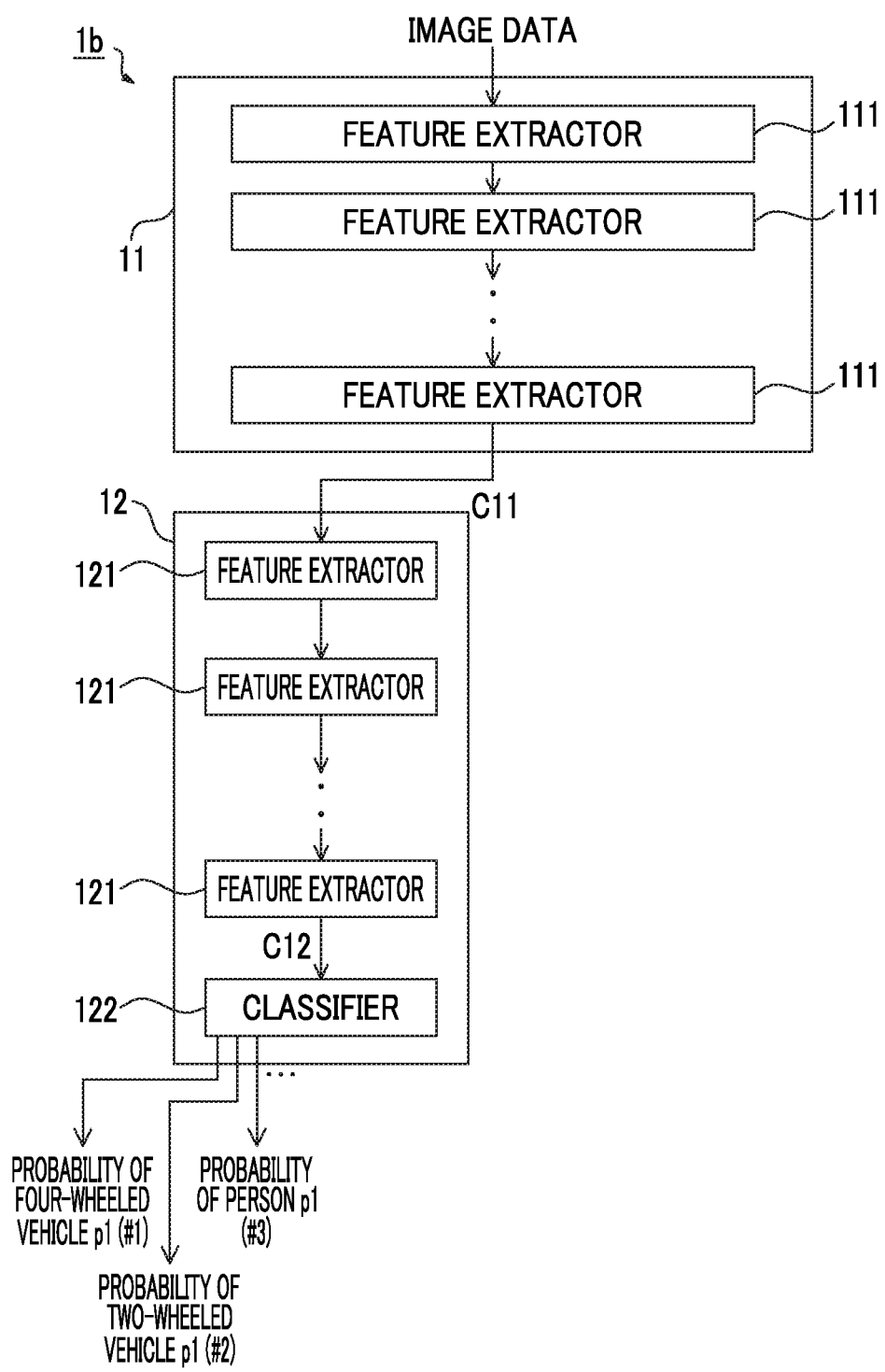
FIG. 7 is a block diagram illustrating a configuration of the perception device which is implemented using the second implementing method.

(2-2) Second Implementing Method of Implementing Perception Device 1 as Perception Device 1b in Vehicle 3b The second implementing method of implementing the perception device 1 as the perception device 1b in the vehicle 3b will be described below with reference to FIGS. 6 and 7. FIG. 6 is a block diagram illustrating the configuration of the vehicle 3b in which the perception device 1 is implemented using the second implementing method. FIG. 7 is a block diagram illustrating the configuration of the perception device 1b which is implemented using the second implementing method. The same elements as the elements of the vehicle 3a will be referenced by the same reference signs and detailed description thereof will not be repeated.

As illustrated in FIG. 6, the vehicle 3b includes a camera 31, an ECU 32b, a brake actuator 332, a brake device 335, and a warning device 338.

The ECU 32b controls a part of operations of the vehicle 3b. In this embodiment, particularly, the ECU 32b includes the perception device 1b and a vehicle control unit 322b as processing blocks which are logically embodied in the ECU 32b. As illustrated in FIG. 7, the perception device 1b is a perception device which is obtained by separating the common neural network 11 and the branch neural network 12 from the perception device 1. That is, the perception device 1b is a perception device including the common neural network 11 and the branch neural network 12 but not including the branch neural network 13. In this way, when the perception device 1b does not include the branch neural network 13 and includes the common neural network 11 and the branch neural network 12, the perception device 1b can still perceive a category of an object with the first accuracy which is relatively low. The vehicle control unit 322b determines whether there is a likelihood that the vehicle 3b will collide with an object near the vehicle 3b based on the perception result from the perception device 1b. When it is determined that there is a likelihood that the vehicle 3b will collide with an object near the vehicle 3b, the vehicle control unit 322b controls the brake actuator 332 such that a braking force is applied from the brake device 335 to the vehicle 3b to avoid the collision. When it is determined that there is a likelihood that the vehicle 3b will collide with an object near the vehicle 3b, the vehicle control unit 322b may control the warning device 338 in addition to or instead of controlling of the brake actuator 332 such that a driver is warned that there is a likelihood that the vehicle 3b will collide with the object. The warning device 338 warns the driver that there is a likelihood that the vehicle 3b will collide with the object, for example, using a warning sound, a warning image, or vibration of a steering wheel.

(3) Training Operation of Perception Device 1

Figure 8:
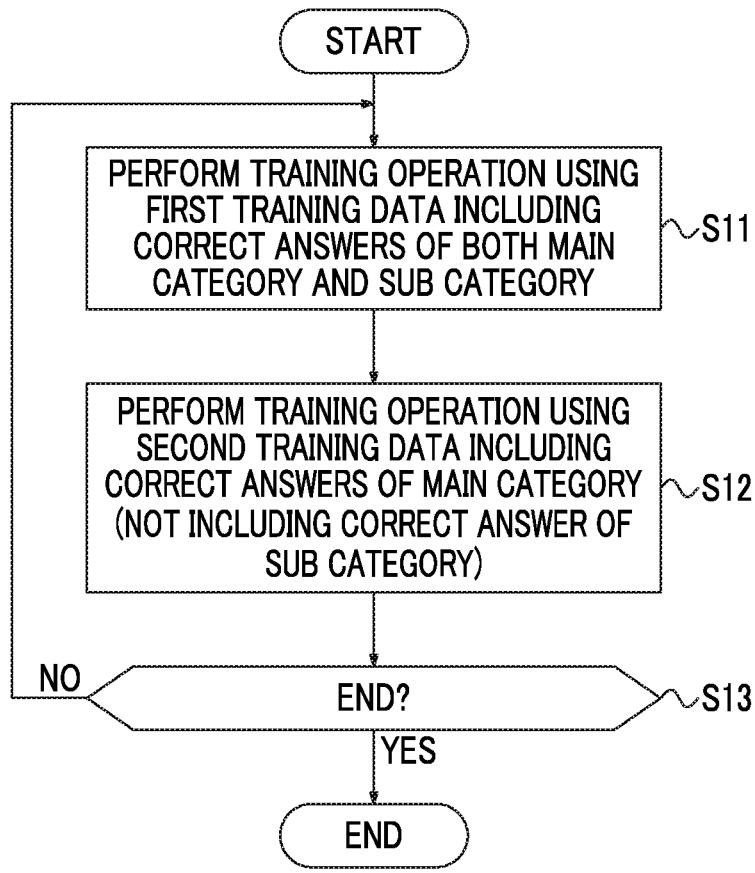
FIG. 8 is a flowchart illustrating a flow of a training operation of the perception device.

Before the perception device 1 is implemented as the perception device 1a or 1b in the vehicle 3a or 3b, the perception device 1, that is, the common neural network 11, the branch neural network 12, and the branch neural network 13, performs a training operation in the processor 2. The training operation of the perception device 1 will be described below with reference to FIGS. 8 and 9. FIG. 8 is a flowchart illustrating a flow of the training operation of the perception device 1. FIG. 9 is a table illustrating an example of training data which is used for the training operation.

As illustrated in FIG. 8, first, the perception device 1 performs the training operation using predetermined first training data (Step S11). The first training data includes a plurality of data sets in which image data indicating an image in which an object of which the main category and the sub category have been determined appears, correct answer data indicating a correct answer of probabilities p1 that the object belongs to a plurality of main categories, and correct answer data indicating a correct answer of probabilities p2 that the object belongs to a plurality of sub categories are correlated.

In the example illustrated in FIG. 9, the first training data includes a data set in which image data indicating an image in which an object #A1 of which the main category is four-wheeled vehicle and the sub category is passenger car appears and correct answer data indicating that the probability p1 that the object #A1 belongs to a main category of four-wheeled vehicle and the probability p2 that the object #A1 belongs to a sub category of passenger car are 1 and that the probability p1 that the object #A1 belongs to main categories other than four-wheeled vehicle and the probability p2 that the object #A1 belongs to sub categories other than passenger car are 0 are correlated. In the example illustrated in FIG. 9, the first training data includes a data set in which image data indicating an image in which an object #A2 of which the main category is four-wheeled vehicle and the sub category is truck appears and correct answer data indicating that the probability p1 that the object #A2 belongs to the main category of four-wheeled vehicle and the probability p2 that the object #A2 belongs to the sub category of truck are 1 and that the probability p1 that the object #A2 belongs to main categories other than four-wheeled vehicle and the probability p2 that the object #A2 belongs to sub categories other than truck are 0 are correlated. In the example illustrated in FIG. 9, the first training data includes a data set in which image data indicating an image in which an object #A3 of which the main category is four-wheeled vehicle and the sub category is bus appears and correct answer data indicating that the probability p1 that the object #A3 belongs to the main category of four-wheeled vehicle and the probability p2 that the object #A3 belongs to the sub category of bus are 1 and that the probability p1 that the object #A3 belongs to main categories other than four-wheeled vehicle and the probability p2 that the object #A3 belongs to sub categories other than bus are 0 are correlated. In the example illustrated in FIG. 9, the first training data includes a data set in which image data indicating an image in which an object #B1 of which the main category is two-wheeled vehicle and the sub category is motorbike appears and correct answer data indicating that the probability p1 that the object #B1 belongs to the main category of two-wheeled vehicle and the probability p2 that the object #B1 belongs to the sub category of motorbike are 1 and that the probability p1 that the object #B1 belongs to main categories other than two-wheeled vehicle and the probability p2 that the object #B1 belongs to sub categories other than motorbike are 0 are correlated. In the example illustrated in FIG. 9, the first training data includes a data set in which image data indicating an image in which an object #B2 of which the main category is two-wheeled vehicle and the sub category is bicycle appears and correct answer data indicating that the probability p1 that the object #B2 belongs to the main category of two-wheeled vehicle and the probability p2 that the object #B2 belongs to the sub category of bicycle are 1 and that the probability p1 that the object #B2 belongs to main categories other than two-wheeled vehicle and the probability p2 that the object #B2 belongs to sub categories other than bicycle are 0 are correlated. In the example illustrated in FIG. 9, the first training data includes a data set in which image data indicating an image in which an object #C1 of which the main category is person and the sub category is pedestrian appears and correct answer data indicating that the probability p1 that the object #C1 belongs to the main category of person and the probability p2 that the object #C1 belongs to the sub category of pedestrian are 1 and that the probability p1 that the object #C1 belongs to main categories other than person and the probability p2 that the object #C1 belongs to sub categories other than pedestrian are 0 are correlated. In the example illustrated in FIG. 9, the first training data includes a data set in which image data indicating an image in which an object #C2 of which the main category is person and the sub category is driver appears and correct answer data indicating that the probability p1 that the object #C2 belongs to the main category of person and the probability p2 that the object #C2 belongs to the sub category of driver are 1 and that the probability p1 that the object #C2 belongs to main categories other than person and the probability p2 that the object #C2 belongs to sub categories other than driver are 0 are correlated.

When the training operation using the first training data is performed, one piece of image data included in the first training data is input to the common neural network 11. As a result, the common neural network 11 outputs a feature vector C11 corresponding to the input one piece of image data to the branch neural network 12 and the branch neural network 13. The branch neural network 12 outputs the probabilities p1 that one object appearing in the input one piece of image data belongs to a plurality of main categories based on the feature vector C11 output from the common neural network 11. The branch neural network 12 outputs a feature vector C which is generated in the course of calculating the probabilities p1 to the branch neural network 13. The branch neural network 13 outputs the probabilities p2 that one object appearing in the input one piece of image data belongs to a plurality of sub categories based on the feature vector C11 output from the common neural network 11 and the feature vector C output from the branch neural network 12. The outputting of the probabilities p1 and p2 is repeatedly performed until inputting of all image data included in the first training data to the common neural network 11 is completed.

Thereafter, parameters indicating operation characteristics of the common neural network 11, the branch neural network 12, and the branch neural network 13 are adjusted such that errors between the outputs of the branch neural networks 12 and 13 and the correct answer data decrease. Preferably, the parameters indicating the operation characteristics of the common neural network 11, the branch neural network 12, and the branch neural network 13 are adjusted such that the errors between the outputs of the branch neural networks 12 and 13 and the correct answer data are minimized. That is, the perception device 1 performs a training operation based on a supervised learning algorithm. In this case, the perception device 1 may perform the training operation, for example, using a backpropagation method.

Adjustment of parameters of the common neural network 11 may include adjustment of parameters of at least one of the feature extractors 111. For example, adjustment of parameters of the common neural network 11 may include adjustment of filter characteristics of the convolution filter which is used by at least one of the feature extractors 111. Adjustment of parameters of the common neural network 11 may include adjustment of arbitrary characteristics of at least one of the feature extractors 111. Regarding the branch neural network 12, similarly, adjustment of parameters of the branch neural network 12 may include adjustment of parameters of at least one of the feature extractors 121. Regarding the branch neural network 13, similarly, adjustment of parameters of the branch neural network 13 may include adjustment of parameters of at least one of the feature extractors 131.

Adjustment of parameters of the branch neural network 12 may include adjustment of parameters of the classifier 122. For example, adjustment of parameters of the branch neural network 12 may include adjustment of weights of a plurality of nodes N constituting fully connected layers 1221 of the classifier 122. Adjustment of parameters of the branch neural network 12 may include adjustment of an activation function which is used by the output layer 1222 of the classifier 122. The activation function is, for example, a softmax function. Adjustment of parameters of the branch neural network 12 may include adjustment of arbitrary characteristics (especially characteristics associated with calculation of the probability p1) of the classifier 122. Regarding the branch neural network 13, similarly, adjustment of parameters of the branch neural network 13 may include adjustment of parameters of the classifier 132.

After the training operation using the first training data has been completed, subsequently, the perception device 1 performs the training operation using predetermined second training data (Step S12). The second training data includes a plurality of data sets in which image data indicating an image in which an object of which the main category has already been determined appears and correct answer data indicating a correct answer of the probabilities p1 that the object belongs to a plurality of main categories are correlated. That is, the second training data is different from the first training data in that the image data and correct answer data indicating a correct answer of probabilities p2 that the object belongs to a plurality of sub categories are not correlated. Accordingly, a part of the first training data, that is, the image data and the correct answer data indicating the correct answer of the probabilities p1, can be used as the second training data.

When the training operation using the second training data is performed, one piece of image data included in the second training data is input to the common neural network 11. As a result, the branch neural network 12 outputs the probabilities p1 that one object appearing in the input image data belongs to a plurality of main categories. On the other hand, the branch neural network 13 may not output the probabilities p2 that one object appearing in the input image data belongs to a plurality of sub categories. The outputting of the probabilities p1 is repeatedly performed until inputting of all image data included in the second training data to the common neural network 11 is completed.

Thereafter, parameters indicating operation characteristics of the common neural network 11 and the branch neural network 12 are adjusted such that errors between the output of the branch neural network 12 and the correct answer data decrease. Preferably, the parameters indicating operation characteristics of the common neural network 11 and the branch neural network 12 are adjusted such that errors between the output of the branch neural network 12 and the correct answer data are minimized. On the other hand, parameters indicating the operation characteristics of the branch neural network 13 are not adjusted. Adjustment of parameters which is performed in the training operation using the second training data is the same as adjustment of parameters which is performed in the training operation using the first training data.

The training process in Step S11 and the training process in Step S12 are repeatedly performed if necessary (Step S13).

(4) Technical Advantages

As described above, in this embodiment, the perception device 1 includes the common neural network 11 that performs the common process, the branch neural network 12 that performs the first perception process of perceiving a category of an object with the first accuracy which is relatively low, and the branch neural network 13 that performs the second perception process of perceiving a category of an object with the second accuracy which is relatively high. The outputs of the feature extractors 121 of the branch neural network 12 are input to the feature extractors 131 of the branch neural network 13. Accordingly, the branch neural network 12 and the branch neural network 13 can be trained in parallel (that is, simultaneously) using the same first training data indicating a relationship between an object and both a main category and a sub category to which the object belongs (that is, substantially indicating dependency between the main category and the sub category). That is, the branch neural network 12 and the branch neural network 13 can be constructed in parallel. As a result, the perception device 1 that can be implemented as the perception device 1a that can perceive a category of an object with the second accuracy which is relatively high and the perception device 1b that can perceive a category of an object with the first accuracy which is relatively low can be constructed more efficiently. That is, since construction of the perception device 1 is equivalent to parallel construction of the perception devices 1a and 1b, the perception devices 1a and 1b can be constructed more efficiently in comparison with a case in which the perception devices 1a and 1b are separately independently constructed (for example, are trained separately using different training data).

Since the perception device 1 includes the branch neural network 12, the perception device 1 itself can also be used as the perception device 1b even when the common neural network 11 and the branch neural network 12 are independently separated from the perception device 1. That is, the perception device 1a that can perceive a category of an object with the second accuracy which is relatively high includes the branch neural network 12 and thus can also be used as the perception device 1b that can perceive a category of an object with the first accuracy which is relatively low. In this case, since construction of the perception device 1 is equivalent to construction of the perception devices 1a and 1b in parallel, the perception devices 1a and 1b can be constructed relatively efficiently.

Since the outputs of the feature extractors 121 of the branch neural network 12 are input to the feature extractors 131 of the branch neural network 13, the training results of the branch neural network 12 are also substantially reflected in the branch neural network 13. Accordingly, in comparison with a case in which the training results of the branch neural network 12 are not reflected in the branch neural network 13, the branch neural network 13 can more suitably perceive a category of an object with the second accuracy which is relatively high.

When the training operation using the second training data is performed, adjustment of parameters of the branch neural network 13 is stopped. Accordingly, even when the common neural network 11 and the branch neural network 12 are trained using the second training data, parameters of the branch neural network 13 are not unnecessarily adjusted by the training. Accordingly, only the common neural network 11 and the branch neural network 12 can be trained without adversely affecting the branch neural network 13.

(5) Modified Examples

Image data may be data including a plurality of channels of data components. For example, image data may be data including three channels of data components of RGB color model. In this case, the number of channels which are substantially used to perceive a category of an object by the perception device 1a may be different from the number of channels which are substantially used to perceive a category of an object by the perception device 1b. For example, the number of channels which are substantially used to perceive a category of an object by the perception device 1b may be smaller than the number of channels which are substantially used to perceive a category of an object by the perception device 1a. The number of channels which are substantially used to perceive a category of an object by the perception device 1a may be equal to the number of channels which are substantially used to perceive a category of an object by the perception device 1b.

In the above description, the perception device 1 can perceive a category of an object with the first accuracy which is relatively low and also perceive the category of the object with the second accuracy which is relatively high. However, the perception device 1 may be able to perceive arbitrary characteristics of an object in addition to or instead of the category of the object with the first accuracy which is relatively low and also perceive the arbitrary characteristics of the object with the second accuracy which is relatively high. An example of arbitrary characteristics of an object is a position of the object (for example, a position in a three-dimensional space). In this case, the perception device 1 may be able to specify a position of an object with a third accuracy which is relatively low and specify the position of the object with a fourth accuracy which is relatively high. Alternatively, in addition to characteristics of an object appearing in an image captured by the camera 31, the perception device 1 may perceive characteristics of an arbitrary object with the first accuracy which is relatively low and perceive the characteristics of the object with the second accuracy which is relatively high.

Each feature extractor 111 may include another processing unit in addition to or instead of at least one of the convolution processing unit 1111 and the pooling processing unit 1112. For example, each feature extractor 111 may include a normalization processing unit that performs a normalization process. The feature extractors 121 and 131 may also include another processing unit.

In the above description, the number of feature extractors 131 is equal to the number of feature extractors 121 and the feature vector C which is calculated by the feature extractor 121 in the same stage as each feature extractor 131 is input to the corresponding feature extractor 131. However, the number of feature extractors 131 may be different from the number of feature extractors 121 and the feature vectors C which are calculated by the same number of feature extractors 121 as the feature extractors 131 may not be input to the feature extractors 131. Specifically, the feature vector C which is calculated by at least one of the M feature extractors 121 may be input to at least one of the N feature extractors 131. Two feature vectors C which are calculated by two or more different feature extractors 121 may be input to a certain feature extractor 131. A feature vector C which is calculated by the same feature extractor 121 may be input to two or more different feature extractors 131.

In the above description, the common neural network 11 is a convolutional neural network. However, the common neural network 11 may be another type of neural network. For example, the common neural network 11 may be a recurrent neural network (RNN). For example, the common neural network 11 may be a long short-term memory (LSTM). The same is true of the branch neural network 12 and the branch neural network 13.

After the perception device 1 is implemented as the perception device 1a in the vehicle 3a, the perception device 1a may perform the training operation. That is, the perception device 1a may perform online training. In this case, the perception device 1a may perform online training using a supervised learning algorithm or may perform online training using an unsupervised learning algorithm. The same is true of a case in which the perception device 1 is implemented as the perception device 1b in the vehicle 3b.

(5) Supplements

The following supplements are additionally disclosed for the above-mentioned embodiments.

(5-1) Supplement 1

A perception device described in Supplement 1 includes: a first neural network that receives first input data associated with an object, performs a common process associated with perception of the object based on the first input data, and outputs results of the common process; a second neural network that receives an output of the first neural network as second input data, performs a first perception process of perceiving the characteristics of the object with a first accuracy based on the second input data, and outputs results of the first perception process; and a third neural network that receives the output of the first neural network and intermediate data, which is generated by the second neural network in the course of the first perception process, as third input data, performs a second perception process of perceiving the characteristics of the object with a second accuracy which is higher than the first accuracy based on the third input data, and outputs results of the second perception process.

According to the perception device described in Supplement 1, the intermediate data which is generated by the second neural network that performs the first perception process is input to the third neural network that performs the second perception process. That is, the intermediate data is used by the third neural network in addition to the second neural network. Accordingly, the second neural network and the third neural network can be trained in parallel using the same first input data. That is, the second neural network and the third neural network can be constructed in parallel. Accordingly, in comparison with a case in which the second and third neural networks are separately constructed, it is possible to more efficiently construct the second neural network and the third neural network. Accordingly, the perception device can be used as a first perception device that can perceive characteristics of an object with a first accuracy which is relatively low using the results of the first perception process, and the perception device can also be used as a second perception device that can perceive the characteristics of the object with a second accuracy which is relatively high using the results of the second perception process. Alternatively, it is possible to construct the first perception device that can perceive characteristics of an object with the first accuracy which is relatively low by separating the first and second neural networks from the perception device, and it is possible to construct the second perception device that can perceive characteristics of an object with the second accuracy which is relatively high using the perception device without separating the first and second neural networks from the perception device. As a result, it is possible to construct two types of perception devices from the perception device described in Supplement 1. That is, when the perception device described in Supplement 1 is constructed, two types of perception devices are constructed. Accordingly, it is possible to more efficiently construct a perception device that can perceive characteristics of an object with the first accuracy which is relatively low and a perception device that can perceive characteristics of an object with the second accuracy which is relatively high.

(5-2) Supplement 2

A perception device described in Supplement 2 is the perception device described in Supplement 1, wherein the first to third neural networks perform a first training process using first training data in which the first input data, first correct answer data indicating the characteristics of the object corresponding to the first input data with the first accuracy, and second correct answer data indicating the characteristics of the object corresponding to the first input data with the second accuracy are correlated with each other.

According to the perception device described in Supplement 2, the second neural network and the third neural network can be trained in parallel using the first training data. Accordingly, it is possible to more efficiently construct a perception device that can perceive characteristics of an object with the first accuracy which is relatively low and a perception device that can perceive characteristics of an object with the second accuracy which is relatively high.

(5-3) Supplement 3

A perception device described in Supplement 3 is the perception device described in Supplement 1 or 2, wherein the first and second neural networks perform a second training process using second training data in which the first input data and first correct answer data indicating the characteristics of the object corresponding to the first input data with the first accuracy are correlated with each other and which does not include second correct answer data indicating the characteristics of the object corresponding to the first input data with the second accuracy, and the third neural network does not perform the second training process in a period in which the first and second neural networks are performing the second training process.

According to the perception device described in Supplement 3, even when the first and second neural networks are trained using the second training data not including the second correct answer data indicating characteristics of an object with the second accuracy, the training does not adversely affect the third neural network (especially, it does not affect perception capability of characteristics of an object with the second accuracy).

(5-4) Supplement 4

A perception device described in Supplement 4 is the perception device described in any one of Supplements 1 to 3, wherein the perception device is able to construct another perception device including the first and second neural networks and not including the third neural network by separating the first and second neural networks from the third neural network.

According to the perception device described in Supplement 4, it is possible to more efficiently construct a perception device (that is, the other perception device described in Supplement 4) that can perceive characteristics of an object with the first accuracy which is relatively low and a perception device (that is, the perception device described in Supplement 1) that can perceive characteristics of an object with the second accuracy which is relatively high.

(5-5) Supplement 5

A perception device described in Supplement 5 is the perception device described in any one of Supplements 1 to 4, wherein the characteristics of the object include a category of the object, the first perception process includes a first estimation process of estimating to which of a plurality of first categories the object belongs, and the second perception process includes a second estimation process of estimating to which of a plurality of second categories which are subdivided from the plurality of first categories the object belongs.

According to the perception device described in Supplement 5, it is possible to more efficiently construct a perception device that can estimate to which of the plurality of first categories an object belongs and a perception device that can estimate to which of the plurality of second categories an object belongs.

(5-6) Supplement 6

A perception device described in Supplement 6 is the perception device described in any one of Supplements 1 to 5, wherein the characteristics of the object include a position of the object, the first perception process includes a first specification process of specifying the position of the object with a third accuracy, and the second perception process includes a second specification process of specifying the position of the object with a fourth accuracy which is higher than the third accuracy.

According to the perception device described in Supplement 6, it is possible to more efficiently construct a perception device that can specify a position of an object with the third accuracy and a perception device that can specify a position of an object with the fourth accuracy.

(5-7) Supplement 7

A perception device described in Supplement 7 is the perception device described in any one of Supplements 1 to 6, wherein the second neural network includes a first processing block that outputs the intermediate data by performing at least a part of the first perception process, and the third neural network includes a second processing block that receives the intermediate data and performs at least a part of the second perception process based on the intermediate data.

According to the perception device described in Supplement 7, it is possible to construct a perception device that includes a second neural network including a first processing block and a third neural network including a second processing block.

(5-8) Supplement 8

A perception device described in Supplement 8 is the perception device described in Supplement 7, wherein the second neural network includes a plurality of first processing blocks which are connected in series in multiple stages such that an output of the first processing block in a previous stage is input to the first processing block in a subsequent stage, the third neural network includes a plurality of second processing blocks which are connected in series in multiple stages such that an output of the second processing block in a previous stage is input to the second processing block in a subsequent stage, and one second processing block of the plurality of second processing blocks performs at least a part of the second perception process based on the intermediate data which is input from one first processing block of the plurality of first processing blocks.

According to the perception device described in Supplement 8, it is possible to construct a perception device that includes a second neural network including a plurality of first processing blocks and a third neural network including a plurality of second processing blocks.

The disclosure is not limited to the above-mentioned embodiment and can be appropriately modified without departing from the gist of the disclosure which can be read from the disclosure, and perception devices with the modifications are included in the technical scope of the disclosure.

What is claimed is:

1. A non-transitory computer readable storage medium storing a program that is executable by one or more processors, the program comprising instructions that cause the one or more processors to function as:
    a first neural network receiving a first input data associated with an object, the first neural network performing a common process associated with perception of the object based on the first input data, the first neural network outputting results of the common process;
    a second neural network receiving an output of the first neural network as a second input data, the second neural network performing a first perception process of perceiving a characteristic of the object with a first accuracy based on the second input data, the second neural network outputting results of the first perception process; and
    a third neural network wherein:
        i) the third neural network receives the output of the first neural network as a part of third input data;
        ii) the third neural network includes a second processing block to which an intermediate data is input as an another part of the third input data, the intermediate data being generated by a first processing block included in the second neural network during the first perception process; and
        iii) the third neural network performs a second perception process of perceiving the characteristic of the object with a second accuracy which is higher than the first accuracy based on the third input data, the third neural network outputting results of the second perception process.

2. The non-transitory computer readable storage medium according to claim 1, wherein:
    each of the first neural network, the second neural network, and the third neural network performs a first training process; and
    the first training process is performed using a first training data in which the first input data, a first correct answer data indicating the characteristic of the object corresponding to the first input data with the first accuracy, and a second correct answer data indicating the characteristic of the object corresponding to the first input data with the second accuracy are correlated all together.

3. The non-transitory computer readable storage medium according to claim 1, wherein:

each of the first neural network and the second neural network performs a second training process, wherein the second training process is performed using a second training data in which the first input data and a first correct answer data indicating the characteristic of the object corresponding to the first input data with the first accuracy are correlated with each other;

the second training data does not include a second correct answer data indicating the characteristic of the object corresponding to the first input data with the second accuracy; and the third neural network does not perform the second training process in a period in which the first neural network and the second neural network are performing the second training process.

4. The non-transitory computer readable storage medium according to claim 1, wherein the instructions of the program cause the one or more processors to construct a perception device including the first neural network and the second neural network and not including the third neural network by separating the first neural network and the second neural network from the third neural network.

5. The non-transitory computer readable storage medium according to claim 1, wherein:
the characteristic of the object is a category of the object;
the first perception process includes a first estimation process, the first estimation process estimating which category among a plurality of first categories the object belongs to;
the second perception process includes a second estimation process, the second estimation process estimating which category among a plurality of second categories the object belongs to; and
the second categories are subdivided from the first categories.

6. The non-transitory computer readable storage medium according to claim 1, wherein:
the second neural network includes a first processing block that outputs the intermediate data by performing at least a part of the first perception process; and
the third neural network includes a second processing block, the second processing block receiving the intermediate data and performing at least a part of the second perception process based on the intermediate data.

7. The non-transitory computer readable storage medium according to claim 6, wherein:
the second neural network includes a plurality of the first processing blocks;
the plurality of the first processing blocks are connected in series such that an output of the first processing block in a previous stage is input to the first processing block in a subsequent stage;
the third neural network includes a plurality of the second processing blocks;
the plurality of the second processing blocks are connected in series such that an output of the second processing block in a previous stage is input to the second processing block in a subsequent stage; and
one second processing block of the plurality of the second processing blocks performs at least a part of the second perception process based on the intermediate data which is input from one first processing block of the plurality of the first processing blocks.

8. A perception device comprising a processor programmed to function as:

a first neural network receiving a first input data associated with an object, the first neural network performing a common process associated with perception of the object based on the first input data, the first neural network outputting results of the common process;

a second neural network receiving an output of the first neural network as a second input data, the second neural network performing a first perception process of perceiving a characteristic of the object with a first accuracy based on the second input data, the second neural network outputting results of the first perception process; and a third neural network wherein:
  i) the third neural network receives the output of the first neural network as a part of third input data;
  ii) the third neural network includes a second processing block to which an intermediate data is input as an another part of the third input data, the intermediate data being generated by a first processing block included in the second neural network during the first perception process; and
  iii) the third neural network performs a second perception process of perceiving the characteristic of the object with a second accuracy which is higher than the first accuracy based on the third input data, the third neural network outputting results of the second perception process.

9. The perception device according to claim 8, wherein:
each of the first neural network, the second neural network, and the third neural network performs a first training process; and
the first training process is performed using a first training data in which the first input data, a first correct answer data indicating the characteristic of the object corresponding to the first input data with the first accuracy, and a second correct answer data indicating the characteristic of the object corresponding to the first input data with the second accuracy are correlated all together.

10. The perception device-according to claim 8, wherein:
each of the first neural network and the second neural network performs a second training process,
wherein the second training process is performed using a second training data in which the first input data and a first correct answer data indicating the characteristic of the object corresponding to the first input data with the first accuracy are correlated with each other;
the second training data does not include a second correct answer data indicating the characteristic of the object corresponding to the first input data with the second accuracy; and
the third neural network does not perform the second training process in a period in which the first neural network and the second neural network are performing the second training process.

11. The perception device according to claim 8, wherein the perception device is able to construct another perception device including the first neural network and the second neural network and not including the third neural network by separating the first neural network and the second neural network from the third neural network.

12. The perception device according to claim 8, wherein:
the characteristic of the object is a category of the object;
the first perception process includes a first estimation process, the first estimation process estimating which category among a plurality of first categories the object belongs to;

the second perception process includes a second estimation process, the second estimation process estimating which category among a plurality of second categories the object belongs to; and the second categories are subdivided from the first categories.

13. The perception device according to claim 8, wherein:

the second neural network includes a first processing block that outputs the intermediate data by performing at least a part of the first perception process; and the third neural network includes a second processing block, the second processing block receiving the intermediate data and performing at least a part of the second perception process based on the intermediate data.

14. The perception device according to claim 13, wherein:

the second neural network includes a plurality of the first processing blocks;

the plurality of the first processing blocks are connected in series such that an output of the first processing block in a previous stage is input to the first processing block in a subsequent stage;

the third neural network includes a plurality of the second processing blocks;

the plurality of the second processing blocks are connected in series such that an output of the second processing block in a previous stage is input to the second processing block in a subsequent stage; and one second processing block of the plurality of the second processing blocks performs at least a part of the second perception process based on the intermediate data which is input from one first processing block of the plurality of the first processing blocks.

15. A non-transitory computer-readable storage medium storing a computer-executable program for perceiving a characteristic of an object with different levels of accuracy, the program comprising instructions that cause at least one processor to function as:

a first neural network that:

inputs data associated with the object;

performs a feature extraction process on the input data to extract a feature of the object; and outputs data indicating the extracted feature;

a second neural network that:

inputs the data indicating the extracted feature from the first neural network;

based on input the data indicating the extracted feature, performs a first perception process to perceive a characteristic of the object with a first level of accuracy; and generates and outputs intermediate data during an intermediate stage of the first perception process; and a third neural network that:

inputs the data indicating the extracted feature from the first neural network;

inputs the intermediate data output from the second neural network; and based on the input the data indicating the extracted feature and the input intermediate data, performs a second perception process to perceive the characteristic of the object with a second level of accuracy that is higher than the first level of accuracy.

* * * * *